Patented Aug. 13, 1929.

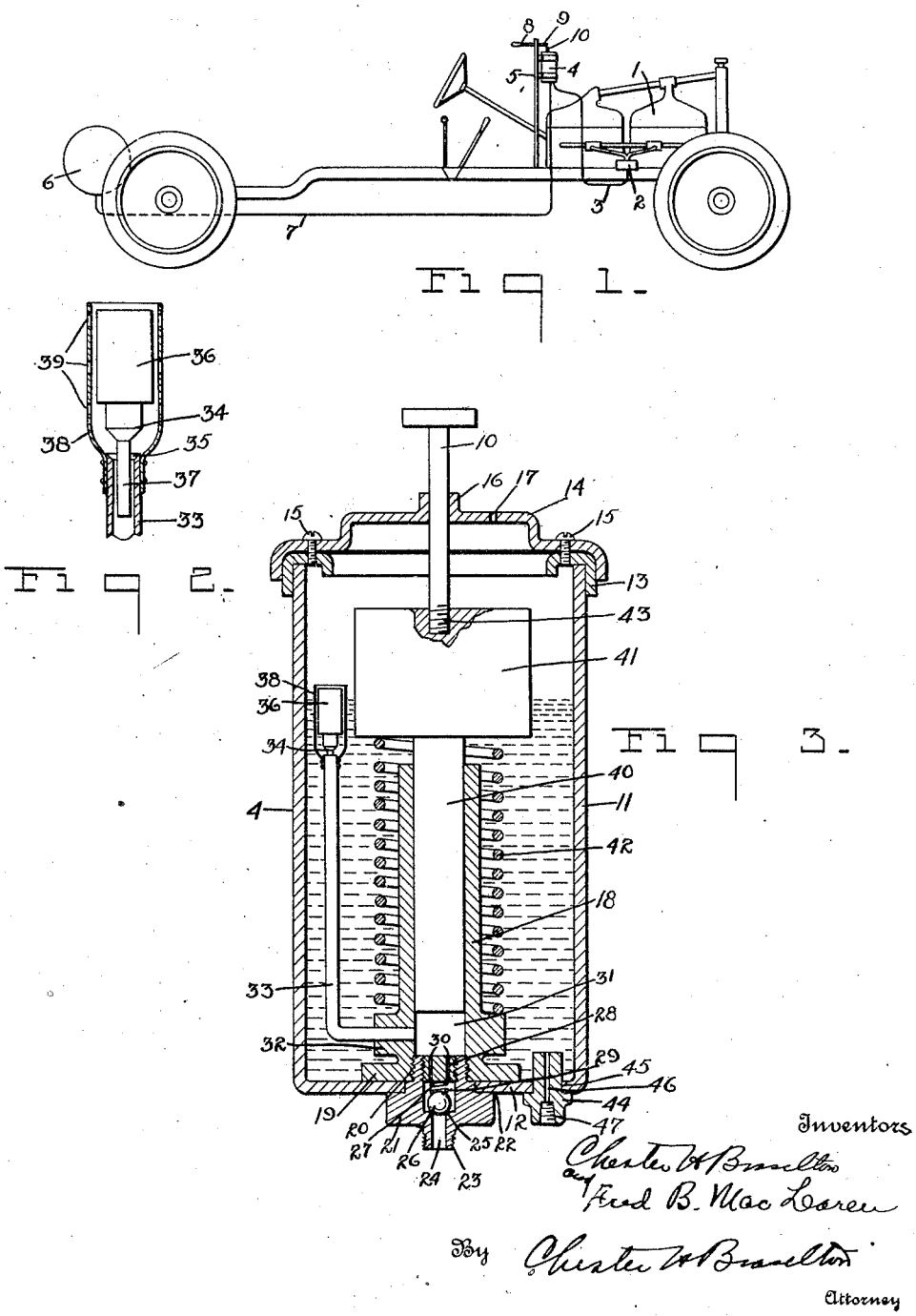

1,724,177

UNITED STATES PATENT OFFICE.

CHESTER H. BRASELTON, OF NEW YORK, AND FRED B. MacLAREN, OF JAMAICA, NEW YORK; SAID MacLAREN ASSIGNOR TO SAID BRASELTON.

INERTIA-OPERATING PUMP.

Application filed February 1, 1922, Serial No. 533,495. Renewed August 10, 1926.

This invention relates to inertia operating pumps wherein the vibration of the pump cylinder or the piston element thereof will, due to the inertia of the other elements loosely connected with the same, cause a pumping operation between the piston and cylinder, and has to do more particularly with means for reducing the pumping effect or rendering it entirely ineffective or useless when the fluid pump reaches a certain level in the receiving chamber for the pump. It is a modification of the constructions shown in our co-pending applications entitled "Vibration operated pumping mechanism", Serial No. 533,493, filed Feb. 1, 1922, and "Method and apparatus for pumping fluid", Serial No. 531,137, filed Jan. 23, 1922.

The invention is shown as applied to use in connection with a vehicle so that the vibration of the same due to the running of the vehicle over the road or caused by engine vibration or other means, serves to pump liquid fuel from a supply tank of lower level into a higher level auxiliary tank from which the liquid may flow by gravity to the carburetor.

The invention also relates to various mechanical features of design and operation which will more fully hereinafter appear by reference to the accompanying drawings forming a part of this specification and in which, Figure I is a conventional showing of an automobile with our invention applied thereto.

Figure II is a detail of a liquid control float valve shown in Figure III.

Figure III is a vertical sectional view of the pumping mechanism used in Figure I.

In the drawings a conventional form of an automobile is shown including an engine 1 fed by a carburetor 2. The carburetor is fed through pipe 3 from an auxiliary pumping tank 4 mounted on the dash 5 of the automobile so that any vibration of the automobile will serve to vibrate the tank 4. The main supply tank for liquid fuel is shown at 6 at the rear of the automobile and a feed pipe 7 connects this supply tank with the pumping tank 4. The pumping tank 4 is, by means of its mechanism hereinafter described, kept constantly supplied with liquid fuel, the pumping mechanism being operated whenever the pump tank 4 is vibrated by either the running of the car over the road, by engine vibration, or by shaking of the automobile, or the tank 4 may be manually filled with liquid fuel by operating the pumping mechanism through a lever 8 mounted on the dash, the forward end 9 of which works against a rod 10 projecting from the upper part of the pump tank and extending inside the tank where it is connected with the inertia piston of the vibrating pump. By lifting up the free end of the lever 8 the end 9 of the lever will force the rod 10 and its piston inside the pump down and upon release of the handle 8 the piston of the pump will automatically rise, due to spring pressure. Successive operations of this kind will quickly fill the pump tank 4 with the desired amount of liquid fuel.

The pump tank 4 is shown in Figure 3 in which the side 11 and bottom 12 of the pump tank are formed preferably of pressed metal. A ring 13 of stamped metal fits over the top of the sides of the tank and is soldered or permanently fastened in place. This ring 13 forms a seat for cap 14 which may be secured thereto by screws 15. Any suitable gasket may be arranged between the cap 14 and ring 13 or between the ring 13 and the top of the tank if desired. The central part of the cap 14 has a boss 16 which is apertured to form a guide for rod 10. The fit between the rod 10 and this boss is sufficiently loose to allow passage of air around the rod 10 in order that the inside of the tank may at all times be under atmospheric pressure. If desired a small opening 17 may also be supplied in the cap 14 to further insure atmospheric pressure being retained in the inside of the tank.

The pump tank as shown, includes a pump cylinder and piston. The cylinder 18 is mounted centrally of the tank with the flange 19 resting on the bottom of the inside of the tank. The inside of the cylinder is threaded at 20 for cooperation with threads on a valve containing nut 21 having a shoulder 22 adapted to bear against the lower side of the bottom of the tank when the nut is in place, the nut serving to fasten the cylinder 18, bottom 12 of the tank, and the nut firmly together. The nut 21 has a threaded portion 23 by which the same may be connected with supply pipe 7 in the usual manner. The nut has a longitudinal opening 24 counterbored at its upper end so as to form a sharp cornered seat 25 upon which normally rests a ball 26 spring pressed by spring 27 normally against its seat. The upper end of spring 27 bears against the lower surface of a nut 28 screwing into a threaded part of the valve cavity 29 at the upper end. The nut 28 has apertures 30 through which liquid may pass from the valve chamber 29 to the pumping chamber 31.

The cylinder 18 has an enlarged portion 32 around the pump chamber 31 and into this is fitted the lower end of a pipe 33 opening at its bottom into the pump chamber 31. This pipe 31 is closed at its upper end by a valve 34 of conical formation, and adapted to seat against the upper edge 35 of the pipe 33. This valve 34 is carried by the float 36 and is of such a weight that the weight of the float and valve and the guide rod 37 of the valve working in the upper end of tube 33 will normally seat the valve so as to prevent fluid passing downwardly through the tube 33. It is of sufficient lightness however that liquid or fluid may readily be forced upwardly and out of the mouth of the tube 33, the valve automatically opening for this purpose from the pressure of the pump. Should liquid however rise to a level sufficient around the float 36 the float serves to then lift the valve 34 from its seat so that liquid may flow in either direction through the pipe 33. A casing 38 is fastened on the top end of pipe 33 to surround the float 36 so as to prevent the float valve from being brushed from its seat too easily by any splashing of the liquid around the same. The casing has small apertures 39 in its wall so that liquid will rise in the inside of the casing to the same extent as it does on the outside of the casing but the walls of the casing serve to prevent undue splashing around the valve seat or float. By having the lowermost ones of the openings 39 above the valve seat 35 this will insure a supply of liquid at and around the seat 35 at all times so that the film of liquid will tend to make a better valve fit. Of course apertures 39 could be put at the extreme bottom of the casing 38 so that the valve seat would be dry if desired if the liquid did not have a level equal to the valve seat.

A piston 40 works in the cylinder 18 with a fairly loose fit and this piston is preferably made quite heavy and for this purpose, as shown in the drawings, is enlarged at 41 above the upper end of the cylinder. A spring 42, the lower end of which rests upon the top shoulder of enlargement 32 of the cylinder and the upper end of which bears against the under surface of the part 41, tends to normally support the piston at a point of balance, from which it may move in either direction. This point of balance of course is adjustable by varying the weight of the piston or the tension of the spring. It is preferred that the spring be normally a relatively long spring compressed and one that has a fairly slow period of vibration in order that the vibration of the piston when mounted on the spring will be slower than and be able therefore to be aided by the shorter vibrations of all kinds which the automobile or the pump 4 may be subjected to. The rod 10 is screw threaded at 43 at which point it is connected with the upper portion 41 of the piston.

A pipe connection 44 is screwed into the opening 45 at the bottom of the tank and this connection normally extends some distance above the bottom of the inside of the tank so as to leave a space between the bottom of the tank and the top of this connection in which sediment may collect that will not drain through the connection 44. The connection 44 is provided with an opening 46 which is threaded at its lower end at 47 so that, through suitable connections, it may be attached to the feed pipe 3 leading to the carburetor 2. A separate plug may be screwed also in the bottom of the tank if desired so that the contents of the tank may be entirely removed without having to remove the connection 44. For simplicity this has not been shown in the drawings.

The operation of the embodiment shown is as follows: Assuming the tank 4 to be vibrating due to the travel of the automobile over the road or due to engine vibration or manual operation of the lever 8 it will be seen that a relative movement between the piston 40 and the cylinder 18 will take place alternately enlarging and decreasing the pump space 31. As this space is enlarged, assuming that the liquid in the tank 4 is not up to the height of the float 36 the valve 34 will be closed and as the suction in the space 31 is increased as this space is enlarged the valve 26 will open and liquid fuel will be drawn from the rear tank 6 through pipe 7 connected to the nut 21. When the piston starts to go in the opposite direction to decrease the space 31, valve 26 will automatically close and the liquid in the space 31 will be forced out through pipe 33 lifting the float valve 34 and into the liquid containing space of the tank.

If the liquid during any relative vibration between the piston and cylinder is of such a height in the tank that, due to the float 36 the valve 34 is lifted from its seat, then the pipe 33 being open will only draw liquid from the top of pipe 33 into space 31 upon the up stroke of the piston and upon the down stroke of the piston the same will be returned out through pipe 33 to the liquid containing portion of the tank. This condition will exist until the level in the auxiliary tank is lowered below the float by being fed out to the carburetor after which vibration of this sort with the float valve 34 normally closed, will again pump liquid from the rear tank through pump chamber 31 and out through pipe 33 to the auxiliary supply chamber. In this way the float valve 34 forms an automatic control for the pump so that effective pumping from the rear tank is stopped when the supply in the auxiliary tank is at the desired level but the pumping may start again if the level in the auxiliary tank goes below the level desired.

We do not desire, of course, that our protection shall be limited to the particular form shown which is merely illustrative but intend that our protection shall cover other modifications which will occur to those skilled in the art and without departing from the spirit of our invention.

Having thus described our invention what we claim is:

1. In a fuel feed system, an auxiliary high level tank, a main supply tank, a reciprocating pump arranged to lift fuel from said main tank to said auxiliary tank, a delivery conduit leading from said pump to said auxiliary tank, a check valve in said conduit, float operated means adapted to hold said valve open whenever the fuel in the auxiliary tank reaches a certain predetermined level and guide means for said float, operative means adapted to prevent the actuation of said float by the splash of fuel in the tank.

2. In a fuel feed system, an auxiliary high level tank, a main supply tank, a reciprocating pump arranged to lift fuel from said main tank to said auxiliary tank, a delivery conduit leading from said pump to said auxiliary tank, a check valve in said conduit, a float operated means adapted to hold said valve open whenever the fuel in the auxiliary tank reaches a certain predetermined level and means comprising a guard surrounding the float to prevent momentary actuation thereof due to splashing of fuel in the tank and to guide the float in its movement.

3. In a fuel feed system, a main supply tank; an auxiliary high level tank; a pump within said auxiliary tank including a cylinder and a piston movable therein; a conduit intermediate said main and auxiliary tanks; a valve in said conduit; a float chamber connected to said pump cylinder by a conduit; a valve in said chamber; a float connected to said valve and movable in said chamber, said chamber providing means for guiding the movement of said float and for preventing movement thereof, due to splashing of the liquid.

4. In a fuel feed system, the combination of a main supply tank; an auxiliary high level tank; a pump adapted to lift fuel from said main tank to said auxiliary tank; a delivery conduit leading from said pump to said auxiliary tank, the end of said conduit terminating near the top of the high level tank; a check valve in said conduit; float operative means connected to said valve and adapted to hold the valve in open position when the fuel in the auxiliary tank reaches a predetermined level; and means for guiding the movement of said float and preventing operating thereof by liquid splash within said auxiliary tank.

5. In a fuel feed system, the combination of a main supply tank; an auxiliary high level tank; an inertia operated pump within said auxiliary tank operative to lift fuel from the main tank to the auxiliary tank; a conduit between the main and auxiliary tanks; a delivery conduit leading from the pump to said auxiliary tank; a check valve in said delivery conduit; a float operative means for disabling said valve whenever the fuel in the auxiliary tank reaches a predetermined level; and combined guide and splash preventing means associated with said float.

6. In liquid pumping mechanism, the combination of a tank; an inertia operated pump within said tank; a conduit connecting with said pump and tank; a valve in said conduit; a float connected to said valve and operative to disable the pump whenever the liquid in the pump exceeds a predetermined level; and guide means for said float to prevent actuation thereof by splash of the liquid in the tank.

7. In a device of the class described, a tank; an inertia operated pump adapted to pump fuel from a source of supply into said tank; an outlet valve for said pump positioned in said tank and near the top thereof; a float adapted to maintain said valve open when the liquid in said tank rises above a predetermined level; a cylindrical guide around said float adapted to prevent splashing of the fuel against said float; and a plurality of holes in the sides of said guide to permit the fuel to enter therein.

In testimony whereof, we affix our signatures.

CHESTER H. BRASELTON.
FRED B. MacLAREN.